(12) United States Patent
Sinha et al.

(10) Patent No.: US 7,953,749 B2
(45) Date of Patent: May 31, 2011

(54) PROVIDING THE TIMING OF THE LAST COMMITTED CHANGE TO A ROW IN A DATABASE TABLE

(75) Inventors: Bipul Sinha, Foster City, CA (US); Amit Ganesh, San Jose, CA (US)

(73) Assignee: Oracel International Corporation, Redwood Shores, CA (US)

( * ) Notice: Subject to any disclaimer, the term of this patent is extended or adjusted under 35 U.S.C. 154(b) by 812 days.

(21) Appl. No.: 10/871,073

(22) Filed: Jun. 18, 2004

(65) Prior Publication Data

US 2005/0256897 A1 Nov. 17, 2005

Related U.S. Application Data

(60) Provisional application No. 60/570,235, filed on May 11, 2004.

(51) Int. Cl.
G06F 17/30 (2006.01)
(52) U.S. Cl. ........................................ 707/769
(58) Field of Classification Search ............. 707/201, 707/202, 220, 2, 8, 5, 1, 3, 4, 203, 769, 770, 707/776
See application file for complete search history.

(56) References Cited

U.S. PATENT DOCUMENTS

| | | | | |
|---|---|---|---|---|
| 4,646,229 A * | 2/1987 | Boyle | ........................ | 707/203 |
| 4,823,310 A * | 4/1989 | Grand | ........................ | 707/8 |
| 5,212,788 A * | 5/1993 | Lomet et al. | ........................ | 707/201 |
| 5,333,316 A * | 7/1994 | Champagne et al. | ........................ | 707/8 |
| 5,452,445 A * | 9/1995 | Hallmark et al. | ........................ | 707/2 |
| 5,553,279 A * | 9/1996 | Goldring | ........................ | 707/201 |
| 5,613,113 A * | 3/1997 | Goldring | ........................ | 707/202 |
| 5,806,076 A * | 9/1998 | Ngai et al. | ........................ | 707/203 |
| 5,812,840 A * | 9/1998 | Shwartz | ........................ | 707/4 |
| 5,842,197 A * | 11/1998 | Ho | ........................ | 707/2 |
| 5,870,758 A | 2/1999 | Bamford et al. | | |
| 6,065,018 A * | 5/2000 | Beier et al. | ........................ | 707/202 |
| 6,243,702 B1 * | 6/2001 | Bamford et al. | ........................ | 707/8 |
| 6,546,382 B1 * | 4/2003 | Amor et al. | ........................ | 707/2 |
| 6,618,822 B1 * | 9/2003 | Loaiza et al. | ........................ | 714/20 |
| 6,631,374 B1 * | 10/2003 | Klein et al. | ........................ | 707/8 |
| 6,714,943 B1 | 3/2004 | Ganesh et al. | | |
| 6,882,994 B2 * | 4/2005 | Yoshimura et al. | ........................ | 707/3 |
| 6,999,977 B1 * | 2/2006 | Norcott et al. | ........................ | 707/203 |
| 2002/0107835 A1 * | 8/2002 | Coram et al. | ........................ | 707/1 |
| 2003/0084025 A1 * | 5/2003 | Zuzarte | ........................ | 707/2 |
| 2005/0177590 A1 * | 8/2005 | Chen et al. | ........................ | 707/102 |

* cited by examiner

Primary Examiner — John R. Cottingham
Assistant Examiner — Sherief Badawi
(74) Attorney, Agent, or Firm — Hickman Palermo Truong & Becker LLP

(57) ABSTRACT

Processing a database statement received from a database client, which requests information about the timing of a last committed change to a row in a database table, comprises retrieving a logical time value that represents a commit time associated with the row and providing the value to the client. In one embodiment, providing the logical time value to the client is enabled by database infrastructure in which a virtual column is used to temporarily "store" the value so that the value can be manipulated as if the value resided in a column of the row. Performance of operations that involve the virtual column are processed similar to real columns, as if data was actually logically stored in the virtual column. For example, the virtual column can be used in condition clauses of database statements for concurrency control.

16 Claims, 4 Drawing Sheets

US 7,953,749 B2

PROVIDING THE TIMING OF THE LAST COMMITTED CHANGE TO A ROW IN A DATABASE TABLE

CROSS REFERENCE TO RELATED APPLICATIONS

This application claims the benefit of priority to U.S. Provisional Patent Application No. 60/570,235 filed on May 11, 2004, entitled "ROW LAST COMMIT TIMESTAMP PSEUDO-COLUMN"; the contents of which is incorporated by this reference in its entirety for all purposes as if fully set forth herein.

FIELD OF THE INVENTION

The present invention relates generally to database systems and, more specifically, to a technique for providing timing information regarding the last committed change to a row in a database table.

BACKGROUND OF THE INVENTION

Transactions affecting data values stored in a database are tracked and assigned a transaction identifier. Whenever a transaction makes a change to a database block (or simply, "data block"), a database system creates a transaction entry that is stored in the database block. Each transaction entry references a transaction table entry. A "system commit number" or "system change number" (SCN) is assigned to a transaction when the transaction is committed.

Before a version of a data item is supplied to an active transaction, the database system determines a logical time value associated with the version of the data item. Depending on the logical time value, the database system determines whether the particular version of the data item can be provided to the active transaction. The logical time value represents a time that is at least as recent as the commit time of the committed transaction that most recently updated the version of the data item. This time value may be determined, for example, by identifying the most recent commit time of transactions that are identified in a list head associated with the data item. A logical time value may be in the form of an SCN. Traditionally, logical time values are internal system values that are available only to the database system.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
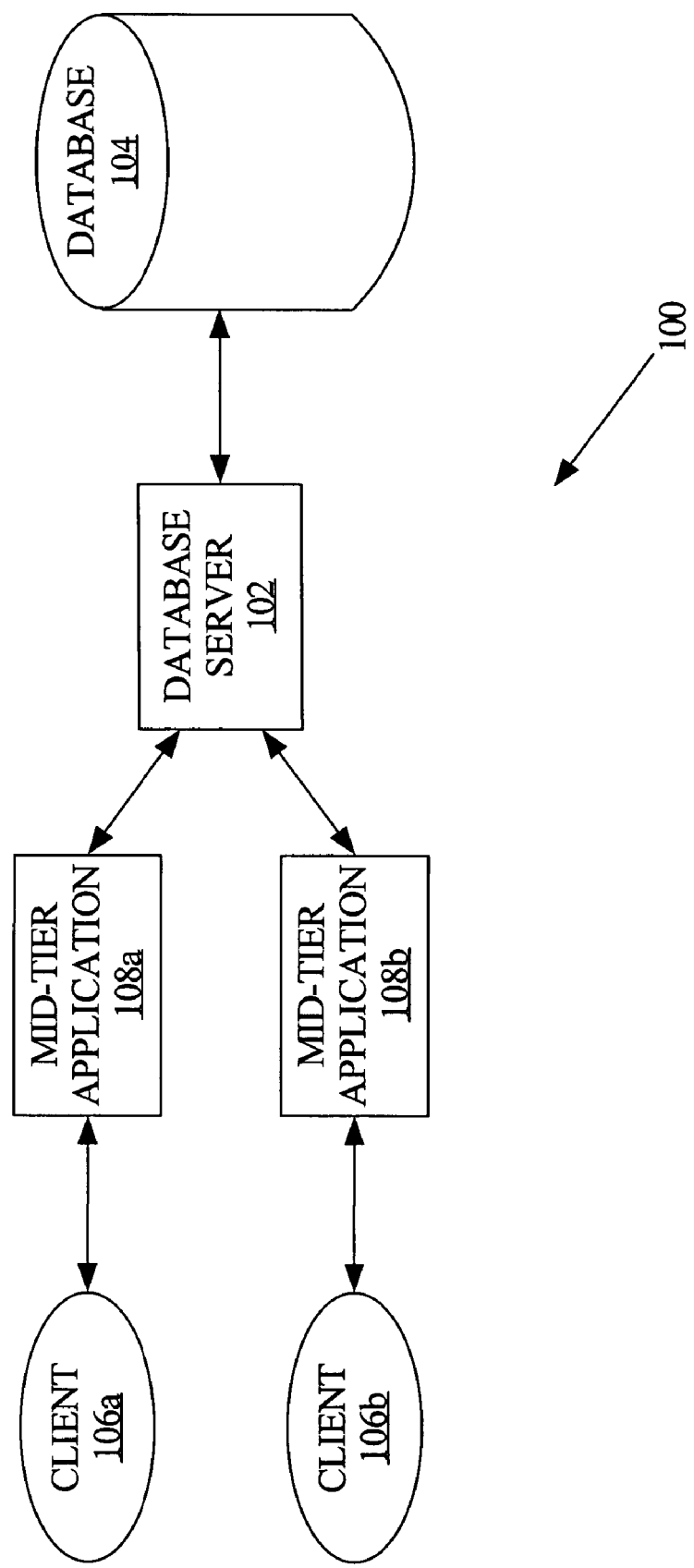
FIG. 1 is a block diagram that illustrates an operating environment in which an embodiment of the invention may be implemented.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview of Embodiments

In one aspect, a technique is provided for processing a database statement that requests information about the timing of a last committed change to a row in a database table. In response to receiving such a request from a database client, a logical time value that represents a commit time associated with the row is retrieved and provided to the client. In one embodiment, providing (or "exposing") the logical time value to the client is enabled by a database infrastructure in which a virtual column (also referred to as a "pseudo-column") is used to temporarily "store" the value so that the value can be provided to the user as if the value resided in the virtual column of the row.

From the clients' viewpoint, the virtual column is just like any real column, and values within the virtual column can be queried like values in a real column. For example, the virtual column can be joined with other virtual or real columns and conditions can be specified based on values in the virtual column (i.e., the virtual column can be used in a predicate of DELETE and UPDATE clauses), and so on. However, the virtual column is a type of column that is effectively ignored by the database query optimizer, i.e., the optimizer does not consider the virtual column when making decisions regarding a query execution plan.

In one embodiment, the logical time value is computed from metadata that is maintained by the database system external to the database table that contains the row to which the logical time value applies. In one embodiment, the logical time value may be block-dependent or row-dependent. When block-dependent, the logical time value is associated with the commit time of a last committed transaction that changed a block of data that contains data for the row. That same block may contain data for multiple rows. When row-dependent, the logical time value is associated with the commit time of a last committed transaction that actually changed the row.

According to one embodiment, it is determined whether a row-dependent logical time value is available and, if so, then the row-dependent logical time value is returned. Otherwise, if it is determined that no row-dependent logical time value is available, then the block-dependent logical time value is returned.

In another aspect, a technique is provided for processing a database statement that requests performance of an operation that involves a virtual column of a database table, such as the virtual column associated with the logical time values that represent transaction commit times associated with rows. In response to receiving such a request from a database client, the operation is performed as if the virtual column stores such logical time values. Non-limiting examples of applications of this technique include (1) concurrency control (e.g., a conditional update based on a comparison of a specified logical time value and the current logical time value for a row), which is very useful for application servers; (2) client cache invalidation; and (3) auditing, to determine whether rows in a table have changed after a given time.

Operating Environment

FIG. 1 is a block diagram that illustrates an operating environment 100 in which an embodiment of the invention may be implemented. FIG. 1 illustrates a simple database system comprising a database server ("server") 102 communicatively coupled to a database 104. Database server 102 is communicatively coupled to database clients ("clients") 106a, 106b via respective mid-tier applications 108a, 108b. The mid-tier applications 108a, 108b are not required to implement embodiments described herein, but are shown in FIG. 1 to illustrate a common operating environment. In addition, only two clients and one server are shown in FIG. 1; however, actual operating environments may include numerous clients and multiple servers, such as in a multiple-node clustered database system.

A database server 102 is a combination of integrated software components and an allocation of computational resources (such as memory and processes) for executing the integrated software components on a processor, where the combination of the software and computational resources are used to manage a particular database, such as database 104. Among other functions of database management, a database server typically facilitates access to database 104 by processing requests from clients 106a, 106b to access the database 104. Server 102 can be implemented on a conventional computer system, such as computer system 400 illustrated in FIG. 4.

Database 104 contains data and metadata that is stored on a persistent memory mechanism, such as a set of hard disks that are communicatively coupled to server 102. Such data and metadata may be stored in database 104 logically, for example, according to relational database constructs, multi-dimensional database constructs, or a combination of relational and multidimensional database constructs. Metadata stored in database 104 includes transaction metadata which represents or can be used to compute a logical time value that represents the commit times of a transactions that changed data stored in data blocks or data logically represented in rows of a database table.

Non-limiting techniques for implementing row versioning, through which past versions of data items associated with rows can be maintained and accessed, are described in U.S. Provisional Patent Application No. 60/500,509, entitled "SYSTEM, STRUCTURE, INTERFACE, AND SEMANTICS FOR IMPLMENTING ROW VERSIONS: ACCESSING PAST VERSIONS OF A DATA ITEM", and U.S. Provisional Patent Application No. 60/500,510, entitled "METHOD AND MECHANISM FOR ROW VERSIONING", the contents of all of which are incorporated by this reference in their entirety for all purposes as if fully set forth herein.

Clients 106a, 106b may be applications executed by computers interconnected to an application server or some other middleware component between clients and server 102, such as mid-tier applications 108a, 108b, via a network, for example. Thus, mid-tier applications 108a, 108b are applications positioned between clients 106a, 106b and server 102, and can provide any number or type of functionalities to clients 106a, 106b, including submission of database statements to server 102 on behalf of clients 106a, 106b. Because multiple clients 106a, 106b and/or multiple mid-tier applications 108a, 108b are capable of concurrently requesting and manipulating data from database 104 through server 102, server 102 employs data consistency mechanisms to maintain the integrity of data persistently stored in database 104.

Figure 2:
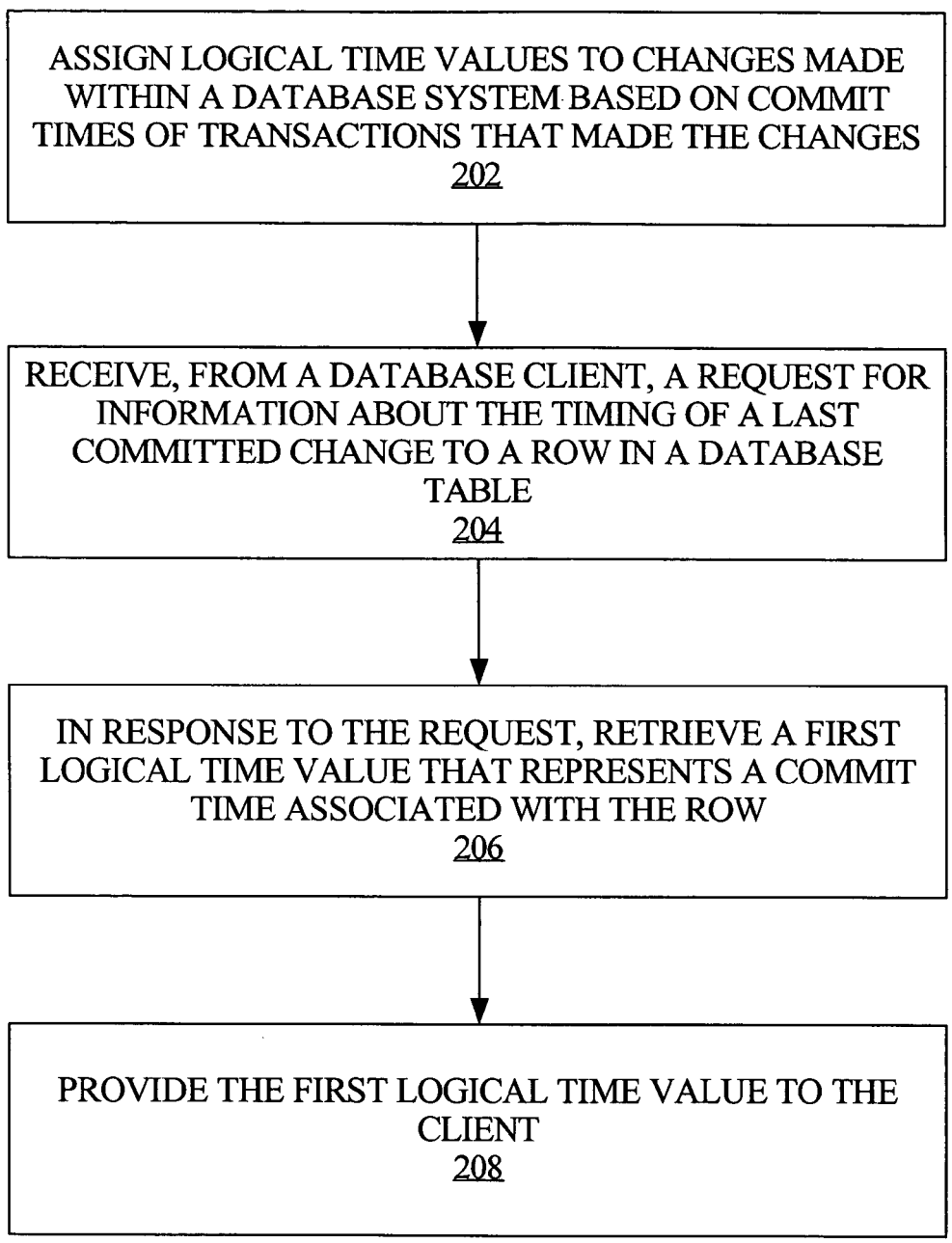
FIG. 2 is a flow diagram that illustrates a method for processing a database statement, according to an embodiment of the invention.

Processing a Database Statement that Requests Information about the Timing of the Last Committed Change to a Data Item FIG. 2 is a flow diagram that illustrates a method for processing a database statement. The method of FIG. 2 can be performed by a database server, such as server 102.

Logical Time Values

At block 202, logical time values are assigned to changes made within a database system, based on commit times of transactions that made the changes. Manners in which database transactions are processed by a database server, including committing and recording relative times of transactions and persistently storing related data in a database, are known in the art and are beyond the scope of this description. One approach to tracking committed transactions to a database and assigning related system change numbers (i.e., "snapshot times") upon each committed transaction, is described in U.S. Pat. No. 5,870,758 entitled "Method And Apparatus For Providing Isolation Levels In A Database System", the content of which is incorporated by this reference in its entirety for all purposes as if fully set forth herein.

A logical time value is a value that represents the commit time of a transaction that changed data in database 104. Logical time values, or at least enough information about a database transaction to compute logical time values (e.g., transaction metadata), are maintained by server 102 for transactions that are committed on data stored in database 104. Logical time values provide relative commit times for respective transactions that change data in database 104 and logical time values typically increase over time. In other words, each logical time value associated with a given data item, whether the value is block-based or row-based, is associated with a specific version of the data item. Therefore, by comparing the logical time values associated with two versions of the same data item, one can determine which version has been more recently changed. Furthermore, the current version of a data item can be determined based on the data item's logical time value relative to other logical time values associated with other versions of the same data item. Examples of client uses of logical time values are described hereafter.

At block 204, a request is received, from a database client, for information about the timing of the last committed change to a row in a database table. For example, a database statement, such as a SQL statement, is received at server 102 from a mid-tier application 108a, 108b or directly from a client 106a, 106b. With "ORA_ROWSCN" being the name of a virtual column that, as perceived by the client, contains the logical time values associated with data items, an example of a request that may be received by server 102 at block 204 is as follows:

SELECT ORA_ROWSCN, name, salary FROM employee WHERE empno=7788, which requests the name and salary of employee number 7788, along with the timing of the last committed transaction that changed any employee data in the row for employee number 7788.

At block 206, a logical time value that represents a commit time associated with the data item, e.g., the row, is retrieved in response to the request received at block 204. The logical time value will typically be different for different versions of the same row. Thus, depending on the version of the row that is requested, the logical time value that is retrieved at block 206 may be the value associated with the current version of the row, or may be the value associated with a past version of the row.

In one embodiment, the logical time value is computed, or generated, from metadata that is maintained by the database system, external to the table in which the row resides. For example, server 102 computes or derives the logical time value based on transaction metadata that is stored in database 104 in association with the version of the row that is used to answer the request. Transaction metadata may include, for example, (a) a transaction identifier of the transaction that created the version of the row, (b) a start time or logical start time identifier of the transaction that created the version of the row, (c) an end time or logical end time identifier of the transaction that created the version of the row, and (d) an identifier of the operation performed on the row to create the version of the row, such as INSERT, UPDATE, or DELETE.

In another embodiment, the logical time value does not require derivation and is simply located and retrieved from persistent storage, such as from database 104.

At block 208, the logical time value is provided to the client that made the request at block 204. For example, server 102 returns the logical time value to a client 106*a*, 106*b*, perhaps via mid-tier application 108*a*, 108*b*, in response to the request. For example, in response to the following SQL query, SELECT ORA_ROWSCN, name, salary FROM employee WHERE empno=7788, the following information is provided in table form:

| ORA_ROWSCN | NAME | SALARY |
|---|---|---|
| 202553 | Fudd | 3000 |

The results indicate that the latest commit operation for the version of the row that is being used to answer the query took place at or before SCN 202553, which is a logical time value used by the database system. A function can be used to convert an SCN, like ORA_ROWSCN, to the corresponding approximate real time value, not system time.

Pseudo-Column for Logical Time Values

Providing (or "exposing") the logical time value to the client is enabled by a database infrastructure in which a virtual column (also referred to as a "pseudo-column") is used to temporarily "store" the value during processing so that the value can be provided to the user as if the value actually resided in a column of the row. From the clients' viewpoint, the virtual column is just like any real column, and values within the virtual column can be queried like values in a real column.

Whether the logical time value is derived from metadata or located and retrieved, the process performed by the server 102 is similar. For example, the processing may be as follows: (a) server 102 recognizes the database operator (e.g., ORA_ROWSCN) and allocates a data buffer (e.g., memory space for a pseudo-column) of a certain type for temporary storage of the logical time value; (b) a query optimizer program of server 102 recognizes the type definition of the buffer and recognizes that generation of the query execution plan (which the optimizer generates) should not base decisions on the presence of, and the processing associated with, the buffer because the buffer acts as a pseudo-column, not a real column; (c) the database operator command and buffer identification are pushed down through the database server "stack" to a low layer of the stack (e.g., to a process that retrieves information from the row source, such as the data block in which the row data is stored); (d) where the process that reads from the row source reads the transaction metadata, derives the logical time value, and populates the buffer with the value (or reads the logical time value directly from the database if the value is persistently stored in the database); and (e) the populated buffer is pushed back up the database server stack along with any other requested data (e.g., to a process that compiles results in response to client-issued database statements).

In the embodiment in which the logical time values are derived, the values within the virtual column are generated on-the-fly and are not persistently stored as database objects (however, the transaction metadata from which the logical time values are derived is persistently stored). There is negligible computational cost associated with retrieving/generating the logical time value associated with a data item in addition to the cost of retrieving the actual data item. For example, there is no additional index to traverse or additional fetch time. Consequently, processing the logical time values as a pseudo-column can legitimately be ignored when generating a query execution plan. In other words, the pseudo-column infrastructure has negligible overhead associated therewith, and processing requests such as the request received at block 204 does not adversely affect the performance of the execution of the query. This would not be the case if the logical time values were maintained in a real column of a database table instead of in a pseudo-column.

Block-Based and Row-Based Logical Time Values

Database systems may maintain logical time values at the data block level, at the row level, or at both the block level and row level. At the block level (i.e., "block-based"), logical time values are maintained which represent commit times of transactions that changed any data stored in a given data block of database 104. Hence, all data items that are stored in the given data block are conservatively associated with the same logical time value, whether or not every data item was actually changed as part of the transaction. At the data item level (i.e., "row-based"), logical time values are maintained which represent commit times of transactions that actually changed data in the particular row. Row-based values provide a finer granularity of logical time values. Either value may be returned in response to the request received at block 204.

One available approach to implementing row-based logical time values is described in U.S. Pat. No. 6,714,943 issued Mar. 30, 2004, entitled "METHOD AND MECHANISM FOR TRACKING DEPENDENCIES FOR REFERENTIAL INTEGRITY CONSTRAINED TABLES, the content of which is incorporated by this reference in its entirety for all purposes as if fully set forth herein.

In one embodiment, at block 206, it is determined whether the commit time of the most recently committed transaction that changed the particular version of row that is being used to answer the query (i.e., row-based logical time value) is available. If a row-based value is available, then the row-based value is provided at block 208. If a row-based value is not available, then the block-based value is provided at block 208.

Processing a Database Statement that Requests an Operation on a Virtual Column

Figure 3:
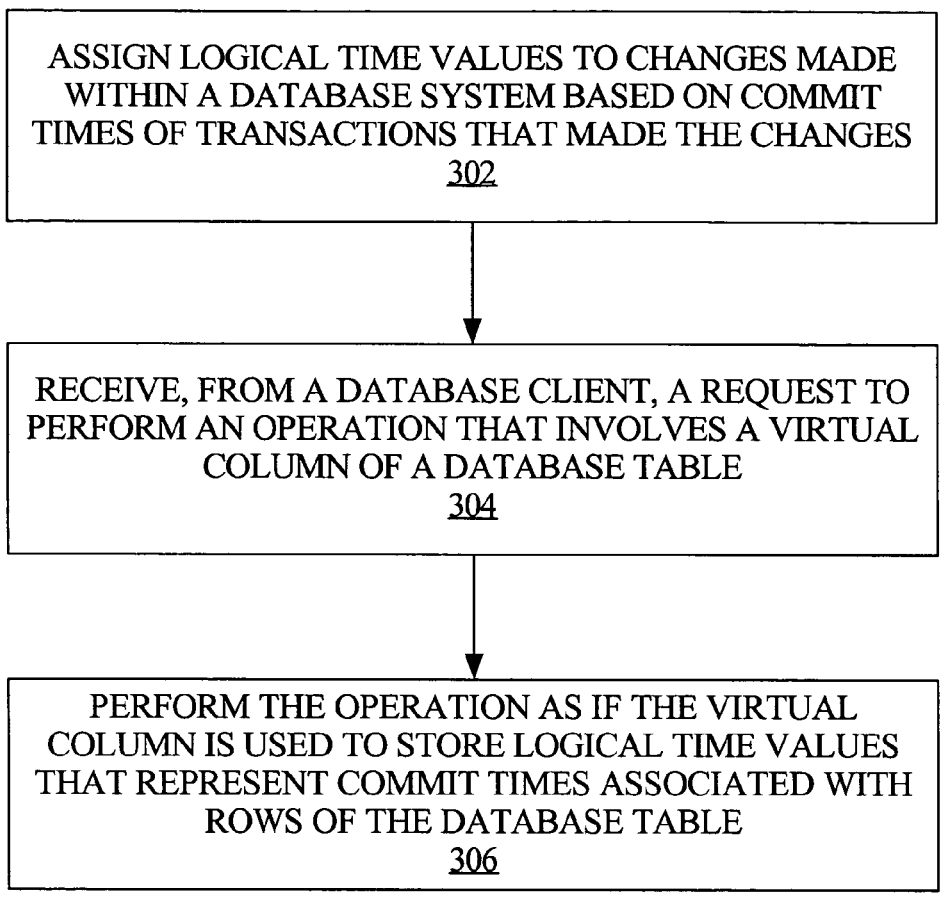
FIG. 3 is a flow diagram that illustrates a method for processing a database statement, according to an embodiment of the invention.

FIG. 3 is a flow diagram that illustrates a method for processing a database statement. The method of FIG. 3 can be performed by a database server, such as server 102.

At block 302, logical time values are assigned to changes made within a database system, based on commit times of transactions that made the changes (similar to block 202 of FIG. 2).

At block 304, a request is received from a database client, to perform an operation that involves a virtual column (e.g., a pseudo-column, as described herein) of a database table. For example, a database statement, such as a SQL statement, is received at server 102 from a mid-tier application 108*a*, 108*b* or directly from a client 106*a*, 106*b*. The request received at block 304 is different than the request received at block 204 of FIG. 2 in that the request of block 304 requests performance of an operation that involves a virtual logical time value column, without actually requesting return of any logical time values from the column. The virtual column operation requested at block 304 can be an operation that is typically performed with a real column, such as joining the virtual column with other virtual or real columns and specifying conditions based on values in the virtual column (e.g., using the virtual column in a predicate of a DELETE or an UPDATE clause). However, SQL INSERT, UPDATE and DELETE operations cannot be performed on a virtual column.

At block 306, the operation that is requested at block 302 is performed as if the virtual column was a real column that stores logical time values that represent commit times associated with rows of the database table with which the virtual column is associated. In other words, once retrieved or generated, values within the virtual column are effectively processed as if the values resided in a real column of a table.

EXAMPLE

A client application, such as a client 106a, 106b, examines a row of data and records the corresponding logical time value as 202553. Later, the application needs to update the row, but only if the application's record of the data is still accurate. Thus, this particular update operation depends, logically, on the row not having been changed since the application retrieved the row of data. The operation is therefore made conditional on the logical time value still being 202553. With "ORA_ROWSCN" being the name of a virtual column that, as perceived by the client, contains the logical time values associated with data items, an example of a request that may be received by server 102 at block 304 is as follows:

UPDATE employee SET salary=salary+100

WHERE empno=7788 AND ORA_ROWSCN=202553.

The conditional update fails in a case in which the logical time value (e.g., the ORA_ROWSCN) is no longer 202553, and no updates are performed. This means that a user or another application changed the row by committing a transaction more recently than the logical time recorded by the client application (i.e., 202553).

The client application queries again to obtain the current version of the row data and the current logical time value, which is now 415639. The application submits the conditional update again, using the new logical time value. With "ORA_ROWSCN" being the name of a virtual column that, as perceived by the client, contains the logical time values associated with data items, an example of a request that may be received by server 102 at block 304 is as follows:

UPDATE employee SET salary=salary+100

WHERE empno=7788 AND ORA_ROWSCN=415639.

This time, the condition is satisfied so the row data is updated and the transaction is committed, thereby triggering generation of a new logical time value that represents the commit time of this transaction.

Hardware Overview

Figure 4:
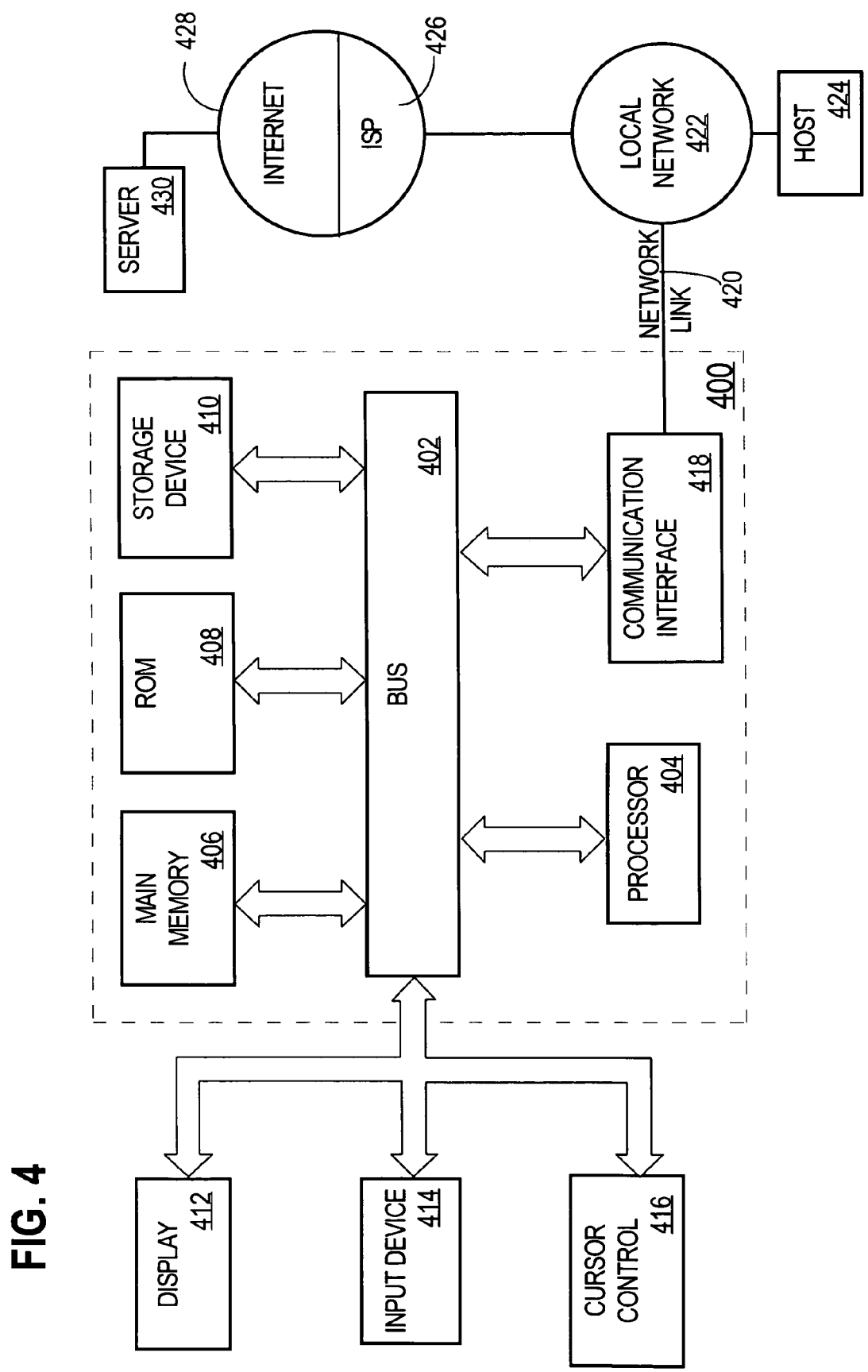
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the computer-implemented steps of:

in a database system, storing in a plurality of data blocks, rows of a database table of a database, each data block of said plurality of data blocks storing a respective set of rows of said database table;

assigning logical time values to changes to said rows of said database table based on commit times of transactions that make said changes;

storing in said plurality of data blocks, commit time information from which said logical time values may be generated, wherein each data block of said plurality of data blocks contains particular commit time information for the respective set of rows stored in said each data block;

receiving queries that request column values from columns in said database table, said queries referencing said columns and said database table by respective names of said columns and said database table;

for each query of said queries, computing said each query by retrieving from said plurality of data blocks said column values of said columns;

wherein said queries include a query that references a virtual column and a particular column of said columns, wherein said virtual column is treated by the database system as a column containing a value representing a logical time value of a last committed change associated with a row in said database table, wherein a database definition of said database table does not define said virtual column as belonging to said table; and wherein computing said queries includes computing said query, computing said query comprising:

retrieving from a particular data block of said plurality of data blocks particular commit time information stored in said particular data block and a column value for said particular column referenced by said query;

based on said particular commit time information, generating a first logical time value that represents a commit time associated with a version of a particular row stored in said particular data block; and returning as a result for said query said first logical time value as a virtual column value for said particular row.

2. The method of claim 1, wherein the query is a Structured Query Language (SQL) statement.

3. The method of claim 1, wherein a database optimizer program makes decisions regarding a query execution plan for executing said query without using said virtual column.

4. The method of claim 1, the method further comprising the computer-implemented steps of:

identifying, based on said query, a condition associated with said query, wherein said condition is based on a second logical time value; and determining whether said condition is satisfied by comparing said first logical time value with said second logical time value.

5. The method of claim 1, wherein the commit time is for a most recently committed transaction that changed said particular data block.

6. The method of claim 1, wherein the commit time is for a most recently committed transaction that changed said row.

7. The method of claim 1, wherein the step of retrieving comprises:

determining whether a commit time of a most recently committed transaction that changed said row is available; and when said commit time of the most recently committed transaction that changed said row is available, then the step of returning comprises returning, as said value for said virtual column, said commit time of the most recently committed transaction that changed said row.

8. The method of claim 7, wherein the step of retrieving comprises:

when said commit time of the most recently committed transaction that changed said row is not available, then the step of returning comprises returning, as said value for said virtual column, a commit time of a most recently committed transaction that changed said particular data block.

9. A computer-readable storage medium carrying one or more sequences of instructions which, when executed by one or more processors, causes the one or more processors to perform steps of:

in a database system, storing in a plurality of data blocks, rows of a database table of a database, each data block of said plurality of data blocks storing a respective set of rows of said database table;

assigning logical time values to changes to said rows of said database table based on commit times of transactions that make said changes;

storing in said plurality of data blocks, commit time information from which said logical time values may be generated, wherein each data block of said plurality of data blocks contains particular commit time information for the respective set of rows stored in said each data block;

receiving queries that request column values from columns in said database table, said queries referencing said columns and said database table by respective names of said columns and said database table;

for each query of said queries, computing said each query by retrieving from said plurality of data blocks said column values of said columns;

wherein said queries include a query that references a virtual column and a particular column of said columns, wherein said virtual column is treated by the database system as a column containing a value representing a logical time value of a last committed change associated with a row in said database table, wherein a database definition of said database table does not define said virtual column as belonging to said table; and wherein computing said queries includes computing a query, computing said query comprising:

retrieving from a particular data block of said plurality of data blocks particular commit time information stored in said particular data block and a column value for said particular column referenced by said query;

based on said particular commit time information, generating a first logical time value that represents a commit time associated with a version of a particular row stored in said particular data block; and returning as a result for said query said first logical time value as a virtual column value for said particular row.

10. The computer-readable storage medium of claim 9, wherein the query is a Structured Query Language (SQL) statement.

11. The computer-readable storage medium of claim 9, wherein a database optimizer program makes decisions regarding a query execution plan for executing said query without using said virtual column.

12. The computer-readable storage medium of claim 9, wherein the steps include:

identifying, based on said query, a condition associated with said query, wherein said condition is based on a second logical time value; and determining whether said condition is satisfied by comparing said first logical time value with said second logical time value.

13. The computer-readable storage medium of claim 9, wherein the commit time is for a most recently committed transaction that changed said particular data block.

14. The computer-readable storage medium of claim 9, wherein the commit time is for a most recently committed transaction that changed said row.

15. The computer-readable storage medium of claim 9, wherein the step of retrieving comprises:

determining whether a commit time of a most recently committed transaction that changed said row is available; and when said commit time of the most recently committed transaction that changed said row is available, then the step of returning comprises returning, as said value for said virtual column, said commit time of the most recently committed transaction that changed said row.

16. The computer-readable storage medium of claim 15, wherein the step of retrieving comprises:

when said commit time of the most recently committed transaction that changed said row is not available, then the step of returning comprises returning, as said value for said virtual column, a commit time of a most recently committed transaction that changed said particular data block.

* * * * *